United States Patent
Coon

(10) Patent No.: US 6,396,666 B1
(45) Date of Patent: *May 28, 2002

(54) DISK DRIVE ACTUATOR ARM WITH DIFFERENTIAL LOAD BEAM BASE SUPPORT

(75) Inventor: Warren Coon, Temecula, CA (US)

(73) Assignee: Magnecomp Corporation, Temecula, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/967,636

(22) Filed: Sep. 28, 2001

Related U.S. Application Data

(63) Continuation of application No. 09/415,370, filed on Oct. 8, 1999, now Pat. No. 6,297,934.
(60) Provisional application No. 60/156,663, filed on Sep. 29, 1999.

(51) Int. Cl.[7] .................................................. G11B 21/16
(52) U.S. Cl. .................. 360/266; 360/244.6; 29/603.03
(58) Field of Search ............................... 360/266, 265.9, 360/244.6, 244.5, 245.2; 29/603.03

(56) References Cited

U.S. PATENT DOCUMENTS 5,561,570 A * 10/1996 Gill et al.
5,999,369 A * 12/1999 Shimizu et al.
6,297,934 B1 * 10/2001 Coon ......................... 360/266

FOREIGN PATENT DOCUMENTS

JP 8-221920 * 8/1996

* cited by examiner

*Primary Examiner*—Craig A. Renner
(74) *Attorney, Agent, or Firm*—Louis J. Bachand

(57) ABSTRACT

In a head stack assembly, opposed pairs of up-facing and down-facing head gimbal assembly suspensions are supported on an actuator arm with a sloped end between the suspensions to provide different support to each pair member during staking operations that fasten the suspension to the arm to minimize gram load change differentials resultant from staking.

7 Claims, 2 Drawing Sheets

DISK DRIVE ACTUATOR ARM WITH DIFFERENTIAL LOAD BEAM BASE SUPPORT

REFERENCE TO RELATED APPLICATION

This application is a continuation of application Ser. No. 09/415,370 filed Oct. 8, 1999, now U.S. Pat. No. 6,297,934, issued Oct. 2, 2000, which application claims the benefit of U.S. Provisional Application Ser. No. 60/156,663, filed Sep. 29, 1999.

BACKGROUND OF THE INVENTION

1. Field of the Invention

This invention relates to disk drive components, and more particularly, to actuators of a new design for combination into head stack assemblies of multiple head gimbal assemblies. Specifically, the invention relates to improvements in the configuration of actuator arms to minimize the net variation in gram load resulting from staking operations during assembly of the head stack.

2. Related Art

An actuator is a mechanism for moving disk drive suspensions arcuately or linearly into position at a disk surface. See FIG. 3 PRIOR ART; The actuator E-block 4 has one or more arms 5 to which the head gimbal assembly load beams 6 are attached, usually two load beams per arm, one above, the upper load beam, and one below, the lower load beam. The load beams are fixed by welding to the planar base 7 of a mounting plate 8 that has an annular boss 9 rising from the base. The lower load beam is attached to a lower mounting plate base and the lower mounting plate boss is inserted into the lower opening of a bore that extends through the arm from its lower face to its upper face. An upper mounting plate boss is similarly inserted into the arm bore upper opening with a load beam attached. The upper and lower mounting plates thus are reversed in orientation and have their respective bosses opposed and differently affected by staking operations. The terms upper and lower herein as applied to mounting plates have reference to the direction of staking. Thus the mounting plate that is closer to the origin of the staking movement is the upper mounting plate and the mounting plate that is closer to the destination of the staking movement is the lower mounting plate.

To secure the oppositely directed mounting plates to the actuator arm, the mounting plate bosses are radially expanded to engage the bore interior wall. A slightly oversize staking tool, such as staking ball 10, is passed through the central opening of the annular bosses 9 to force the boss outward and into bore interior wall engagement.

There is in addition to the radial force being exerted a downward axial force associated with the movement of the staking tool, and this force has a different effect on the upward facing (lower) mounting plate (tends to go convex toward the bore) from its effect on the downward facing (upper) mounting plate (tends to go concave toward the bore). These different effects cause different and difficult to control changes in the shape of the mounting plates and their intended suspension gram preloads.

SUMMARY OF THE INVENTION

A predetermined gram preload, that is the force the suspension applies to the slider at the disk, is designed into each suspension. A change in the suspension preload will cause the suspension slider to perform differently than expected, or desired, since the flying height of the slider is a function not only of its geometry and orientation, but also of the vertical preload force applied against it by the suspension. Flying height varies directly with preload; lack of good preload control will permit excessive variation in the slider flying height.

It has been observed that the standard staking operation (a staking ball passed downward in one direction through opposed mounting plate bosses) causes an increase in preload force of a few percent for upfacing (upper, meaning closer to the origin of staking movement) assemblies in which the slider faces up, and a decrease in the preload force for the downward facing (lower, meaning closer to the destination of staking movement) assemblies in which the slider faces down, owing to the different effect the staking ball movement has on the mounting plates due to apparently different directions of ball passage (base first or boss first) depending on the orientation of the mounting plates within the arm bore. The present invention provides effectively two lengths of actuator arm, while preserving a single actuator arm, by differentiating the lengths of the upper and lower faces of the arm. Thus, the upper face is shorter and the lower face longer and the arm forward edge in between is sloped accordingly to, for example an angle of about 17 to about 26 degrees to the perpendicular (vertical, staking axis). This effective difference presents a shorter actuator arm for the load beam of the upper head gimbal assembly, and a longer actuator arm for the lower head gimbal assembly load beam. The shorter actuator arm, extending to the weld locations, provides minimum upgramming (increase in gram load) with staking and, thus is desirable for the upper head gimbal assembly where upgramming is a problem. The longer actuator arm, extending beyond the weld locations, provides a small upgramming (increase in gram load) to the lower head gimbal assembly that will offset the normal decrease in gram load associated with the lower head gimbal assembly during staking. The combination of minimal upgramming at the upper head gimbal assembly and at least a partial offset of the decrease in gram load at the lower head gimbal assembly provides a considerably smaller, minimized net difference in gram loads between the upper and lower head gimbal assemblies and a more easily controlled gram load at each assembly and more precise flying heights.

It is an object of the invention to provide an improved head stack assembly. It is another object to provide a head stack assembly in which the net difference in gram load changes is minimized between the upper and lower load beams. It is a further object to provide a differently shaped actuator arm such that the upper mounting plate receive less support from the arm and thus tends to upgram the suspension loading less, and the lower mounting plate simultaneously receives more support from the arm so as to upgram the suspension as an offset to the normal decrease in gramming at the lower suspension, and minimize the net differences in gramming between the upper and lower suspensions.

These and other objects of the invention to become apparent hereinafter are realized in a head stack assembly comprising an actuator arm having a bore and distally thereof a sloped distal face providing the arm with a relatively shorter upper face and a relatively longer lower face parallel to said upper face and upper and lower head gimbal assemblies; the upper and lower head gimbal assemblies comprising respectively upper and lower mounting plates each having a central bore and a surrounding base, and upper and lower load beams attached to respective upper and lower mounting plates, the mounting plates being vertically registered and jointly staked to the arm at the bore by a tool passing through the bore from above, whereby the upper mounting plate base is supported more by the upper arm and the lower mount plate is supported less by the lower arm to simultaneously reduce upgramming in the upper load beam and increase upgramming in the lower load beam, whereby the net difference in upper and lower gram loads after the staking is minimized.

In a further embodiment, the invention provides a head stack assembly comprising an actuator arm having a relatively shorter upper face and a relatively longer lower face parallel to said upper face, a common bore extending between the upper and lower faces, and distally of the bore a sloped distal face, and upper and lower head gimbal assemblies comprising upper and lower mounting plates and upper and lower load beams; each mounting plate comprising a base and a central tubular boss insertable into the common bore in opposed relation; the upper and lower load beams being fixed to the upper and lower mounting plate bases respectively, the mounting plate bosses being stakable to the common bore to attach the load beams to the arm common bore by passage of an oversized staking tool through the bosses sequentially from the upper boss to the lower boss, the mounting plate bases being vertically registered and supported by less of the arm at the arm upper face in head stack assembly gram load upgramming reducing relation and supported by more of the arm at the arm lower face in head stack assembly upgramming increasing relation to offset the normal decrease in gram load at the lower arm face, whereby the net difference in upper and lower gram loads after staking is minimized.

In each of the foregoing embodiments, typically, the sloped distal face has an angle of between 17 and 26 degrees relative to the perpendicular extending between the upper and lower arm faces, the upper mounting plate base is supported inward of its forward edge margin, and the lower mounting plate base is supported at its edge margin, and the tool is a staking ball.

In its method aspects, the invention provides a method of maintaining a minimal difference in upper and lower gram loads in a head stack assembly of upper and lower head gimbal assemblies staked to a common actuator arm, including maintaining the upper face of the arm at a first length, maintaining the lower face of the arm at a second length longer than the first face, and thereafter in sequence passing a staking tool through the upper head gimbal assembly mounted to the arm upper face and through the lower head gimbal assembly mounted to the arm lower face in differentially supported relation to decrease upgramming by the upper mounting plate and increase upgramming by the lower mounting plate to thereby minimize the difference in upper and lower gram loads in the head stack assembly.

BRIEF DESCRIPTION OF THE DRAWINGS

The invention will be further described in conjunction with the attached drawings in which.

DETAILED DESCRIPTION

Figure 1:
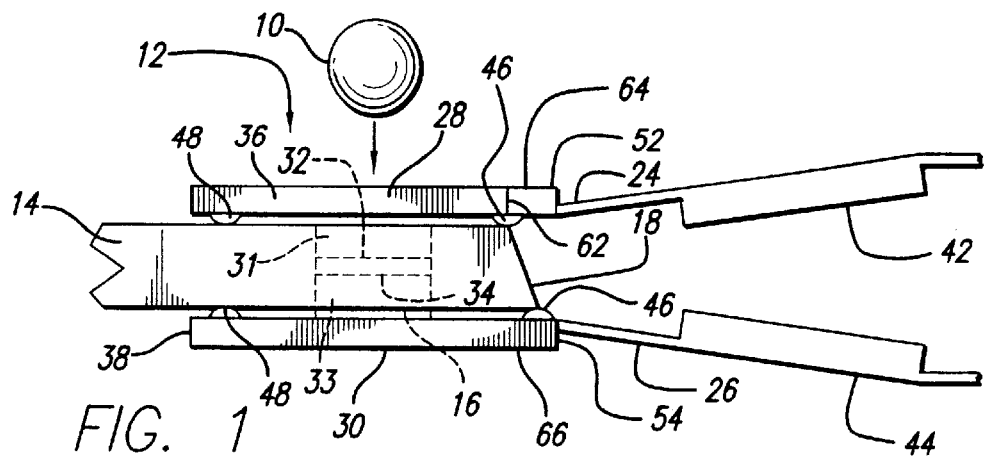
FIG. 1 is a side elevation view of the invention.
Figure 2A:
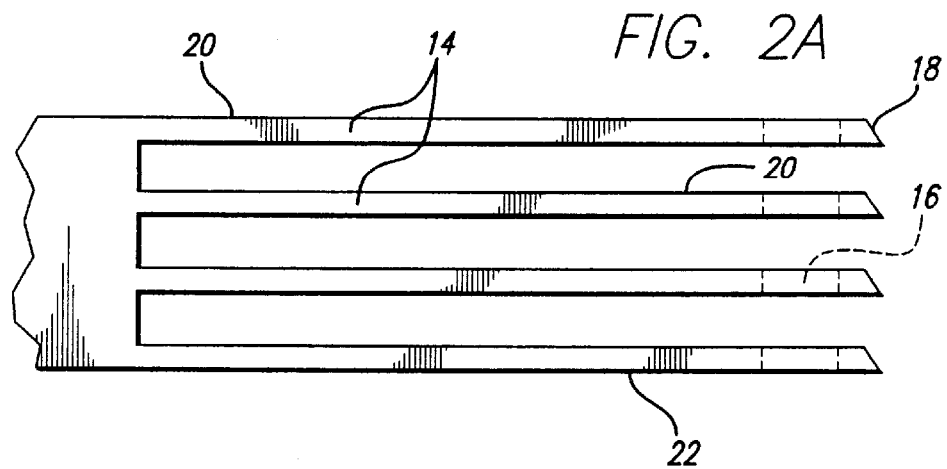
FIG. 2A is side elevation view of the actuator and arms thereof.
Figure 2B:
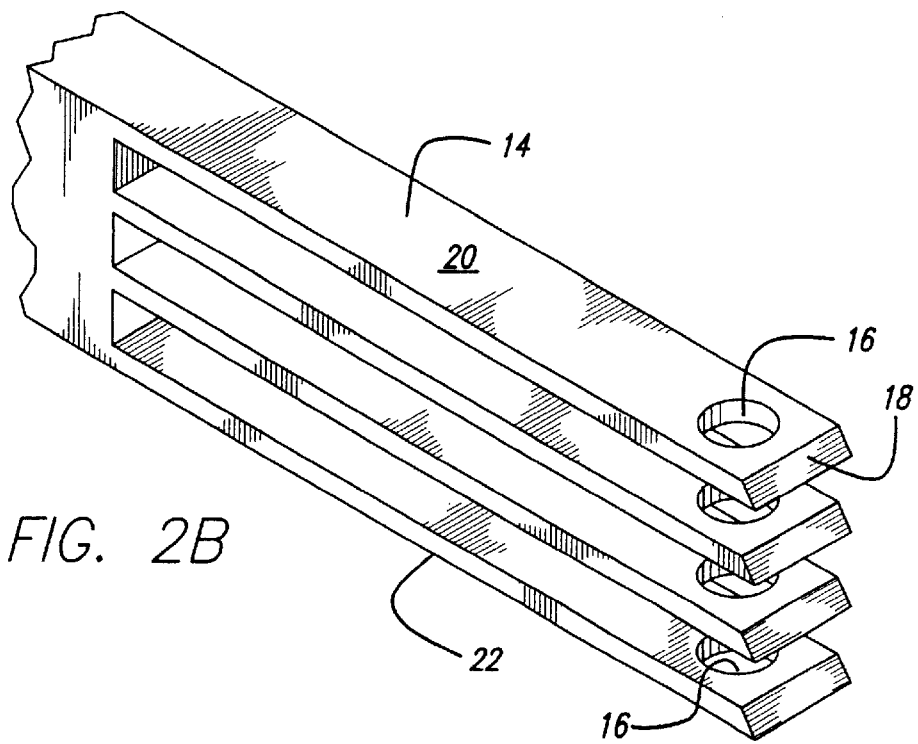
FIG. 2B is an oblique view of the actuator and arms thereof.

With reference now to the drawings in detail, in FIGS. 1 and 2A, 2B the invention head stack assembly 12 comprises an actuator arm 14 having a vertical or transverse bore 16 and distally thereof a sloped distal face 18. Sloped distal face 18 provides the arm 14 with a relatively shorter upper face 20 and a relatively longer lower face 22, and upper and lower head gimbal assemblies 24, 26.

Figure 3:
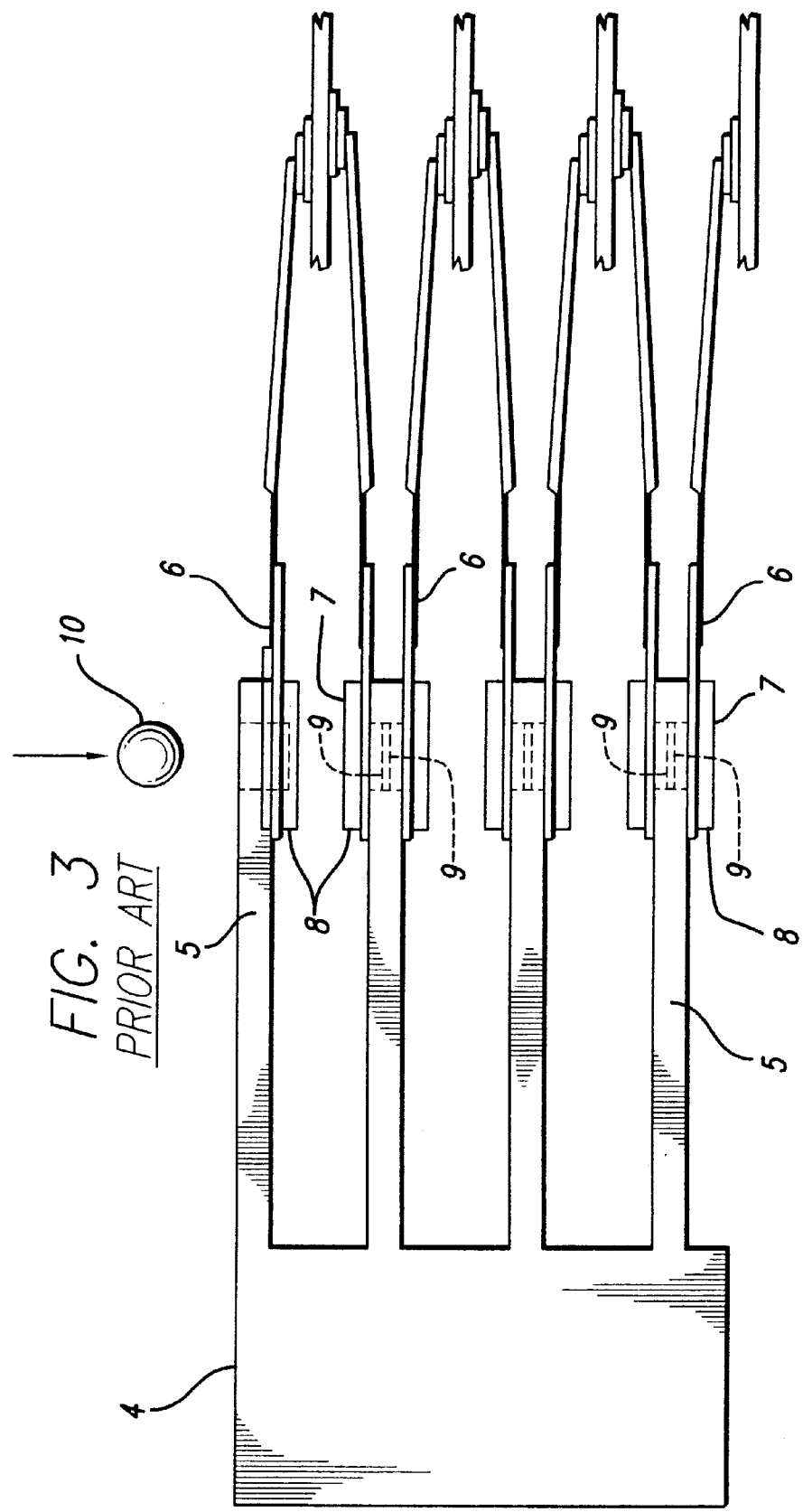
FIG. 3 is PRIOR ART view of a head stack assembly with conventional actuator arms.

The upper and lower head gimbal assemblies 24, 26 comprise respectively upper and lower mounting plates 28, 30 each having a boss 31, 33 with a central bore 32, 34 and a surrounding base 36, 38. Upper and lower load beams 42, 44 attach, as by welding at forward points 46 and rearward points 48 to respective upper and lower mounting plates 28, 30. Mounting plates 28, 30 are coaxial, congruent and vertically registered as shown and jointly staked by a tool as in FIG. 3 to the arm 14 at the bore 16 by passing the tool through the bore from above. With reference particularly to FIG. 1, it will be evident that the upper mounting plate base 36 is supported less extensively (substantially back from its forward edge 52) by the arm upper face 20 than the lower mount plate base 38 is supported by the arm lower face 22 (substantially to the forward edge 54). This arrangement has been found to simultaneously-reduce upgramming in the upper load beam and to increase upgramming in the lower load beam. Since the lower load beam normally tends to a decrease in gramming, the effect in the lower suspension is a relative or net decrease in gramming. This coupled with the reduced upgramming in the upper suspension results in a smaller net change or change overall in gramming, and the net difference in upper and lower gram loads after the staking is minimized.

Thus, in the illustrated embodiment, head stack assembly 12 comprises the actuator arm 14 with the illustrated relatively shorter upper face 20 and the relatively longer lower face 22. Arm 14 has a common bore 16 extending between the upper and lower faces 20, 22. Distally of the bore 16 the arm 14 has distal face 18 typically at an angle of 17–26 degrees to the perpendicular extending between the upper and lower faces.

The upper and lower head gimbal assemblies 24, 26 comprise upper and lower mounting plates 28, 30 and upper and lower load beams 42, 44.

Each mounting plate 28, 30 comprises respectively a base 36, 38 and a central tubular boss 31, 33 having bores 32, 34. Bosses 31, 33 are insertable into the common bore 16 in opposed relation, as shown The upper and lower load beams 42, 44 are fixed to the upper and lower mounting plate bases 36, 38 respectively. The mounting plate bases 36, 38 are vertically registered and given the differences in face length of the upper and lower arm faces 20, 22 the upper base 36 is supported by less of the arm 16 at the arm upper face. Typically, the upper face 20 will stop at a line 62 inward of the base 36 forward edge margin 64. The lower mounting plate base 38 on the other hand is typically supported at its forward edge margin 66.

As previously noted, the described arrangement reduces upgramming at the upper head gimbal assembly and provides some upgramming at the lower head gimbal assembly against a normal decrease in gramming there such that the net difference from the staking operation is minimized.

The invention method thus includes maintaining a minimal difference in upper and lower gram loads in a head stack assembly 12 of upper and lower head gimbal assemblies 24, 26 staked to a common actuator arm 16, including maintaining the upper face 20 of the arm 14 at a first length, maintaining the lower face 22 of the arm at a second length longer than the first face, and thereafter in sequence passing a staking tool such as staking ball 10 through the upper head gimbal assembly mounted to the arm upper face and through the lower head gimbal assembly mounted to the arm lower face in differentially supported relation to decrease upgramming by the upper mounting plate and increase upgramming by the lower mounting plate to thereby minimize the difference in upper and lower gram loads in the head stack assembly.

The invention thus provides an improved head stack assembly in which the net difference in gram load changes is minimized between the upper and lower head gimbal assembly load beams by using a differently shaped actuator arm such that the upper mounting plate receives less support from the arm and thus tends to upgram the suspension loading less, and the lower mounting plate simultaneously receives more support from the arm so as to upgram the suspension as an offset to the normal decrease in gramming at the lower suspension, thereby to minimize the net differences in gramming between the upper and lower suspensions.

I claim:

1. A head stack assembly comprising upper and lower head gimbal assemblies and an actuator arm, said arm having a bore and distally thereof a sloped distal face providing said arm with a relatively shorter upper arm face and a relatively longer lower arm face parallel to said upper arm face; said upper and lower head gimbal assemblies each comprising a load beam having a base and a bore within said base, said load beams being attached to respective ones of said upper and lower arm faces with their said bores being vertically registered and jointly staked to said arm bore, whereby said upper head gimbal assembly load beam is supported less by said upper arm face and said lower head gimbal assembly load beam is supported more by said lower arm face to simultaneously reduce upgramming in said upper load beam and increase upgramming in said lower load beam, whereby the net difference in upper and lower gram loads after said staking is minimized.

2. The head stack assembly according to claim 1, in which said sloped distal face has an angle of between 17 and 26 degrees relative to the perpendicular extending between the upper arm face and said lower arm face.

3. The head stack assembly according to claim 1, in which said load beam bases are staked by a staking ball.

4. A head stack assembly comprising an actuator arm having a relatively shorter upper face and a relatively longer lower face parallel to said upper face, a common bore extending between said upper and lower faces, and distally of said bore a sloped distal face, and upper and lower head gimbal assemblies comprising upper and lower load beams; each said load beam comprising a base and a base bore registerable with said common bore; said upper and lower load beams being stakable to said common bore to attach said load beams to said arm common bore, said load beam bases being vertically registered and supported by less of said arm at said arm upper face in head stack assembly gram load upgramming reducing relation and supported by more of said arm at said arm lower face in head stack assembly upgramming increasing relation to offset the normal decrease in gram load at said lower arm face, whereby the net difference in upper and lower gram loads after staking is minimized.

5. The head stack assembly according to claim 4, in which said sloped distal face has an angle of between 17 and 26 degrees relative to the perpendicular extending between said arm upper face and said arm lower face.

6. The head stack assembly according to claim 4, in which said load beam bases are staked by a staking ball.

7. A method of maintaining a minimal difference in upper and lower gram loads in a head stack assembly of upper and lower head gimbal assemblies including respective upper and lower load beams each having a base and staked to a common actuator arm, including maintaining the upper face of said arm at a first length, maintaining the lower face of said arm at a second length longer than said upper face, and thereafter in sequence passing a staking tool through said upper load beam base mounted to said arm upper face and through said lower load beam base mounted to said arm lower face in differentially supported relation to decrease upgramming in said upper load beam and increase upgramming in said lower load beam to thereby minimize the difference in upper and lower gram loads in said head stack assembly.

* * * * *